United States Patent [19]

Enston

[11] 4,344,168
[45] Aug. 10, 1982

[54] EQUIPMENT FOR PLAYING GRAMOPHONE RECORDS AND METHOD OF OPERATION THEREOF

[76] Inventor: Richard G. Enston, Bwlch Mawr Farm, Conway, North Wales, Wales

[21] Appl. No.: 57,798

[22] Filed: Jul. 16, 1979

[51] Int. Cl.³ .............................................. G11B 3/38
[52] U.S. Cl. .................................................. 369/250
[58] Field of Search .......................... 274/23 R, 23 A; 369/250

[56] References Cited

U.S. PATENT DOCUMENTS

| | | | |
|---|---|---|---|
| 2,006,605 | 7/1935 | Putnoky | 274/23 A |
| 2,585,396 | 2/1952 | Martin | 274/23 A |
| 2,966,360 | 12/1960 | Herve | 274/23 A |
| 3,059,934 | 10/1962 | Urmenyi | 274/23 A |
| 3,313,546 | 4/1967 | Yushikawa | 274/23 R |
| 3,485,501 | 12/1969 | Baker | 274/23 R |
| 3,826,505 | 7/1974 | Birch | 274/23 A |
| 3,924,860 | 12/1975 | Saito | 274/23 R X |
| 4,153,256 | 5/1979 | Guha | 369/250 |

FOREIGN PATENT DOCUMENTS

| | | | |
|---|---|---|---|
| 548480 | 4/1932 | Fed. Rep. of Germany | 369/250 |
| 372317 | 4/1932 | United Kingdom | 369/250 |

*Primary Examiner*—Harry N. Haroian
*Attorney, Agent, or Firm*—LeBlanc, Nolan, Shur & Nies

[57] ABSTRACT

Equipment for playing gramophone records, and a method of operating same to reduce or eliminate so-called lateral tracking error comprising a turntable deck (10), a rotatable turntable (11) thereon, a tone arm (12, 20, 21) pivotally mounted on the deck and carrying a stylus for tracking across a record placed on the turntable, the tone arm being afforded a component of linear forwards movement during operation in combination with the angular inwards movement of the stylus towards the center of the turntable, there being a guidance system (15, 16, 26, 28, 33, 34) to determine and control movement of the tone arm whereby, in use, the longitudinal center line of the stylus maintains alignment with a tangent to the record groove at the point of stylus contact therewith.

12 Claims, 6 Drawing Figures

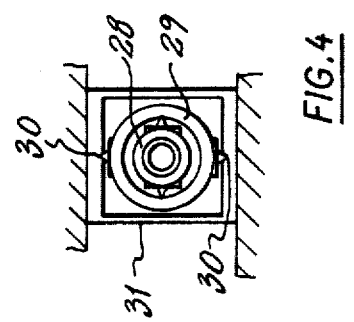
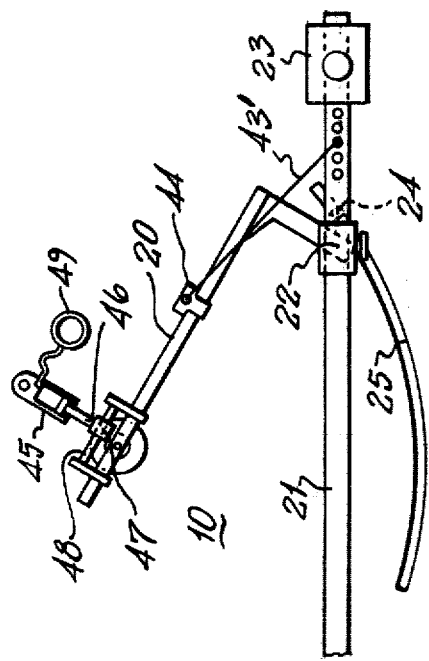
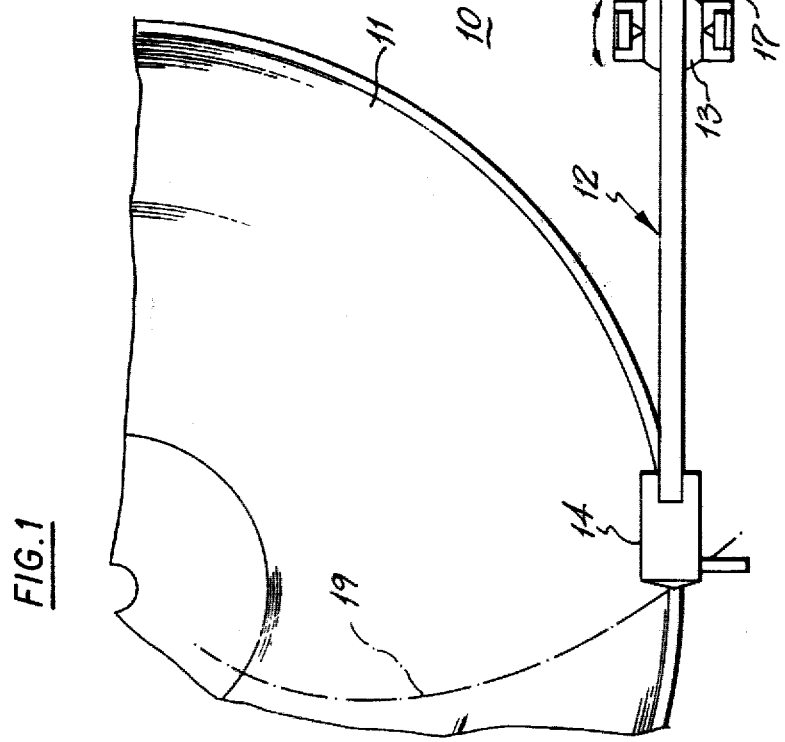

EQUIPMENT FOR PLAYING GRAMOPHONE RECORDS AND METHOD OF OPERATION THEREOF

This invention relates to equipment for playing gramophone records and particularly to the construction and arrangement of a pivotally mounted pick-up arm.

Much advanced technology is employed in the design and manufacture of modern record playing equipment in an attempt to reproduce, as clearly as possible, the originally recorded sound. Original recordings are made on a master disc using a cutting stylus which is mounted to be capable of oscillation from side-to-side and to lie with its longitudinal axis or centre line always at a tangent to the groove being cut.

For the avoidance of uncertainty, the term "the centre line of the stylus" shall be construed herein as the longitudinal axis of the stylus with respect to the transverse oscillatory movement thereof to reproduce the recorded sound. Absolute fidelity of reproduction is possible only if the stylus employed in the pick-up arm of the reproducing equipment is arranged in a similar manner. In most conventional arrangements a pick-up arm of fixed length is pivotally attached to a platform or deck upon which is rotatably mounted the record turntable. The pick-up arm is mounted for pivotal movement about a vertical axis, and the stylus at the free end of the pick-up arm thus describes a fixed arc about the vertical axis of the arm. Therefore, with conventional arrangements of this kind the centre line of the stylus cannot maintain alignment with a tangent to the groove as it tracks across the record, and there arises a phenomenon known as "lateral tracking error" which may be defined as the angular difference between the centre line of the stylus (or of a pick-up cartridge carrying same) and a line drawn at right angles to the record radius at the point of stylus contact on the record. Certain measures have been tried to maintain this angle at a minimum and to keep a constant tangent at the stylus position. These have included means for moving the pivot point of the arm along a line substantially parallel to that along which the stylus tracks across the record. In such cases the stylus is thereby caused to travel substantially in a straight line i.e. radially with respect to the record. Other means have been tried for causing the head shell or cartridge carrying the stylus, to pivot in a controlled manner with respect to the remainder of the arm as the stylus tracks across the record.

An object of the present invention is to provide an improved technique for overcoming lateral tracking error, employing means simple in construction and of low mass when compared with certain of the known devices.

Another object of the present invention is to provide a method of reducing or eliminating lateral tracking error in the operation of equipment for playing gramophone records, which equipment includes a turntable deck, a rotatable turntable thereon, and a tone arm mounted on the deck adjacent the turntable for pivotal movement about a vertical axis, and, at least over a part of its length, about a horizontal axis, a free end of the tone arm carrying a stylus adapted in use to track across a record placed on the turntable, the method comprising the step of imparting to the stylus a component of controlled forwards movement away from the point of pivotal attachment of the tone arm to the deck, as the stylus moves inwardly towards the centre of a record being played, and thus maintaining alignment of the centre line of the stylus with a line drawn at right angles to the record radius at the point of stylus contact therewith.

Yet another object of the invention is to provide equipment for playing gramophone records, comprising a turntable deck, a rotatable turntable thereon, and a tone arm mounted on the deck adjacent the turntable for pivotal movement about a vertical axis, and, at least over a part of its length, about a horizontal axis, a free end of the tone arm carrying a stylus adapted in use to track across a record placed on the turntable, characterised by means imparting to the stylus a component of controlled forwards movement away from the point of pivotal attachment of the tone arm to the deck, as the stylus moves inwardly towards the centre of a record being played, whereby the centre line of the stylus maintains alignment with a line drawn at right angles to the record radius at the point of stylus contact therewith.

Several embodiments of the invention will now be described, by way of example only, with reference to the accompanying drawings, in which:

FIG. 1 is a plan view of one embodiment of the invention;

FIG. 2 is a plan view of a second embodiment;

FIG. 4 is an enlarged view of part of the arrangement of FIG. 3;

Figure 3:
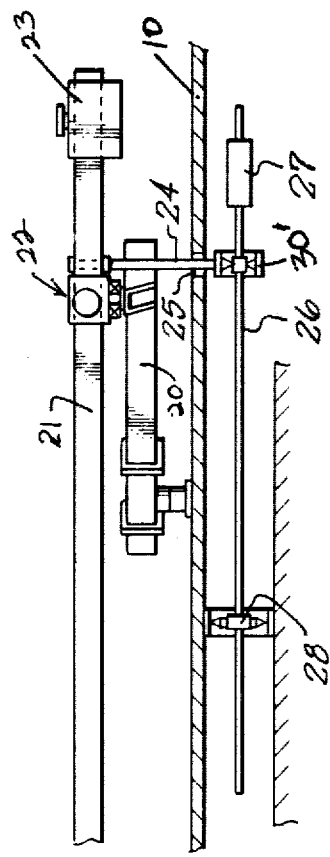
FIG. 3 is a part sectional elevation of the embodiment shown in FIG. 2.

Referring now to FIG. 1 there is provided on a horizontally disposed platform or deck 10 a rotatable turntable 11 and a tone arm generally indicated at 12. The tone arm 12 is mounted for longitudinal sliding movement in a slide block 13 which is mounted on the deck 10 adjacent the turntable 11 for pivotal movement about vertical and horizontal axes. At one end of the tone arm 12 there is provided a fixed head shell 14 which carries a cartridge and stylus (not shown here but indicated by the character S in FIGS. 5 and 6). In the end region of the tone arm 12 remote from the head shell 14, and on the underside thereof, there is provided a bearing member 15 such as a ball bearing, and this is captive in, and constrained to travel in a guide track 16 supported above the deck 10 on a pair of coil springs 17 provided at the ends of the track 16. Also mounted on the deck 10 is a bar 18 which serves as a balance weight and rests on the tone arm 12 on the side of the slide block 13 remote from the head shell 14.

In use, as the stylus tracks across a record placed on the turntable 11, from its circumference towards its centre, the arm is guided by the bearing 15 running in the track 16 so that the head shell and stylus are caused to move forwardly away from the pivotal axis of the slide block 13 as they move inwardly across the record, and thus an arc similar to that indicated at 19 is traced by the stylus so that the longitudinal centre line of the head shell 14 and of the stylus therein maintains alignment with a tangent to the groove, i.e. with a line drawn at right angles to the radius of the record at the point of stylus contact therewith.

The guidance system which determines the path traced by the stylus is comprised in FIG. 1 by the bearing 15 and the channel 16. In practice, it is preferred that the guidance system should be located below the deck 10 so as to be protected from contamination by dust and other atmospheric conditions, and for aesthetic purposes.

Also, whilst the embodiment illustrated in FIG. 1 obeys the theoretical concept of the invention, in practice the friction created between the relatively moving parts of the assembly might render this embodiment unworkable. However, this embodiment is described for the purpose of illustrating the simplest form which the invention might take.

Referring now to FIGS. 2, 3 and 4, in a second, and more practical embodiment, the tone arm is comprised by two articulated portions 20 and 21. The portion 20, which itself consists of two parts fixed together and disposed normally to one another, is mounted for rotation about a vertical axis on the deck 10 and the portion 21 is mounted for pivotal movement about vertical and horizontal axes at the free end of the portion 20, at 22. The portion 21 extends on both sides of the pivot 22 and carries at its end remote from the head shell an adjustable counterweight 23 whose distance from the pivot point 22 can be set to determine the pressure exerted by the stylus on the record. Depending from the tone arm between the pivot 22 and the counterweight 23 is a stem 24 which is preferably comprised by a coil spring and which descends through a slot 25 in the deck 10 and carries at its lower end a guide pin 26 preferably of stainless steel, also carrying an adjustable counterweight 27.

The pin 26 passes through a guide block 28 mounted below the deck 10. The block 28 is pivotally mounted about a horizontal axis in a bearing ring 29 (see FIG. 4) which itself is pivotable about a vertical axis at 30 in a frame 31.

In use, therefore, as the stylus tracks across the record towards the centre the presence of the pin 26 in the guide block 28 causes the portion 20 of the tone arm to rotate clockwise in FIG. 2 thus causing the portion 21 to advance to the left in FIG. 2 such that the stylus experiences a forwards movement with respect to the point of pivotal attachment of the arm portion 20 to the deck 10, which is similar in effect to the sliding movement of the whole tone arm 12 in the embodiment of FIG. 1. The course traced by the stylus can be further determined by preferentially bending the guide pin 26 in a particular manner.

Figure 5:
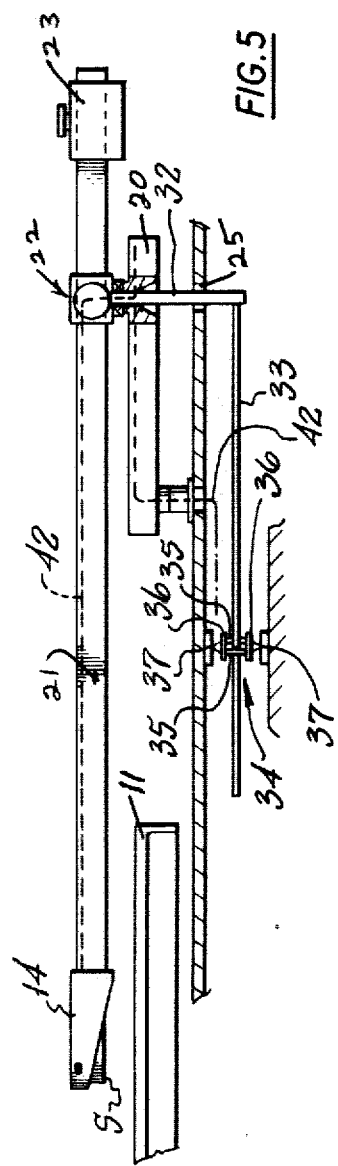
FIG. 5 is a view similar to FIG. 3 of a further embodiment of the invention.

Referring now to FIG. 5, the stem 24 in FIG. 3, which is offset from the pivot 22, is replaced by a similar stem 32 which extends downwardly through the deck 10 from a position directly below the pivot 22 and carries a guide pin 33 at its lower end. As a further modification of the arrangement illustrated in FIG. 3, the guide block 34 consists essentially of a pair of vertically disposed parallel pins 35. The pins 35 are held in spaced relationship by a pair of spaced bearing strips 36 at the upper and lower ends of the pins, and each strip 36 is pivotted at 37 for rotation about a vertical axis.

Therefore, as the stylus tracks across the record, sliding movement of the pin 33 between the pins of the guide block 34 causes the pivot 22, and thus the portion 21 of the arm carrying the stylus, to experience a forwards movement together with the rotational movement created by the stylus tracking in the record groove.

The combined forwards and swinging movement of the portion 21 of the arm ensures that the centre line of the head shell 14, and the stylus S carried thereby is maintained at a tangent to the record groove.

Figure 6:
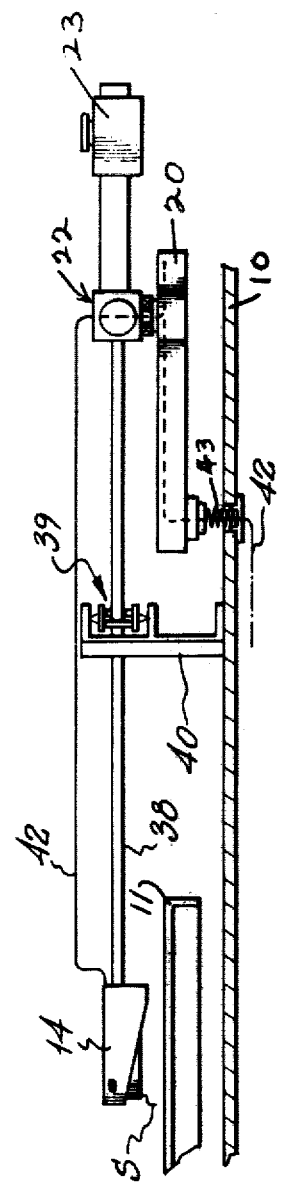
FIG. 6 is a similar view of a still further embodiment.

The embodiment illustrated in FIG. 6 differs from those illustrated in FIGS. 3 and 5 in so far as the portion 21 of the arm is replaced by a portion 38 of reduced diameter which passes through a guide block assembly generally indicated at 39 similar in operation to that illustrated in FIG. 5. In this case, the assembly 39 is mounted for rotational movement with respect to an upstanding bracket 40 attached to the deck 10.

In the embodiments of FIGS. 2, 3 and 5, the pick-up lead (shown at 42 in FIG. 5) connecting the stylus to an associated amplifier is carried through the interior of the tone arm to pass below the deck 10, whilst in the case of FIG. 6, the lead 42 is diverted alongside or above or below the arm to traverse the portion 38 thereof, before passing into the portion 20 of the arm.

In FIG. 6 there is shown an alternative method of mounting the tone arm on the deck 10, by means of a coil spring 43 to provide increased resilience at the mounting point.

It is well known in the production of record playing equipment to provide measures against so-called 'bias' and 'anti-skating'. In known equipment these two phenomena are seen as a tendency for the tone arm to drift towards the centre of a record thus applying an excessive force to the inner wall of the record groove. This leads to uneven wear of the record and unbalanced reproduction of the sound recorded on the two walls of the groove. In the case of systems produced in accordance with the present invention, these two phenomena are experienced in two distinct ways. Bias compensation is provided, as will be described, to apply a side thrust on the tone arm tending to cause the stylus to move outwardly towards the perimeter of the record, whilst an anti-skating device, also to be described in detail, is provided to control the tendency of the arm to move forwards during operation.

As can be seen from FIG. 2, bias compensation is provided by a flexible line 43' attached to the arm portion 21 and passing through an aperture in an upstanding member 44 fixed with respect to the porton 20, there being a weight (not shown) attached to the free end of the line 43' which depends from the member 44. This tends to cause the portion 21 of the tone arm to rotate anti-clockwise with respect to the portion 20 as viewed in FIG. 2. The position of attachment of the line 43' to the portion 21 of the arm is adjustable thus to adjust the effect of the bias compensation.

An anti-skating device which acts to impose a rotational bias on the portion 20 of the tone arm, may, for example, comprise a weighted line system similar to the bias compensation device described above. In a further form of anti-skating device a small hydraulic cylinder 45 has a piston 46 pivotably attached to an adjustable member 47 which is frictionally engaged upon a rail 48 attached to the arm portion 20 and extending alongside the latter to each side of the vertical pivotal axis thereof. A reservoir 49, part-filled with hydraulic fluid, is provided with a screwed cap whose adjustable vertical position applies a selected pneumatic pressure on the hydraulic fluid in the reservoir thus forcing same into the cylinder 45 to extend the piston 46. As can be seen from FIG. 2, if the adjustable member 47 is in the position shown, pressure applied by the cylinder 45 will tend to cause the arm portion 20 to rotate clockwise in FIG. 2, thus imparting a forwards bias on the portion 21 of the arm. Alternatively, if the sliding member 47 is moved to the left in the drawing, then a force from the cylinder 45 will tend to cause the arm portion 20 to rotate anti-clockwise thus acting against any tendency for the arm portion 21 to move forwards. A zero condition for the anti-skating device is provided when the member 47 is positioned mid-way between the ends of the rail 48.

What is claimed is:

1. Equipment for playing gramophone records, in association with a turntable deck having a rotatable record supporting turntable thereon, comprising a tone arm, means for mounting the tone arm adjacent the turntable on the deck such that the arm can pivot about a vertical axis thereon, and, at least a part of the arm can pivot about a horizontal axis, a free end of the tone arm carrying a stylus disposed to track across a rotating record on the turntable, means imparting a component of linear movement of at least a part of the tone arm thus to impart to the stylus during play a degree of forward movement away from the point of pivotal attachment of the tone arm to the deck, a first guide member connected to the tone arm, and a second guide member slidably engaging said first guide member such that the first guide member is constrained and caused to advance forwardly through the second guide member as the stylus tracks across the record, thus to determine and control the track of the stylus, whereby the center line of the stylus maintains alignment with a line drawn at right angles to the record radius at the point of stylus contact therewith.

2. Equipment according to claim 1 wherein said first and second guide members are located below said deck, said first guide member being formed as a generally horizontal pin connected to the lower end of a generally vertical stem which depends from the tone arm through an aperture in the deck.

3. Equipment according to claim 1, wherein said tone arm comprises a pair of articulated arm portions, the first portion being mounted for rotation on said deck about a vertical axis, and the second portion being attached to the first portion for pivotal movement about vertical and horizontal axes relative thereto, the second portion carrying the stylus.

4. Equipment according to claim 2, wherein said stem is attached to the tone arm directly below the pivotal connection of the two portions thereof.

5. Equipment according to claim 2, wherein said stem is attached to the tone arm at a position offset from the pivotal connection of the two portions thereof.

6. Equipment according to claim 3, wherein the second portion of the tone arm carries an adjustable counterweight to determine the tracking force of the stylus on a record.

7. Equipment according to claim 5, wherein said first guide member carries a counterweight to balance same about its point of connection to the tone arm.

8. Equipment according to claim 3, including a bias compensation device adapted to impart a side thrust on the second portion of the tone arm tending to move same outwardly with respect to the centre of the turntable.

9. Equipment according to claim 3, including an anti-skating device adapted to apply a rotational force to the first portion of the tone arm thus additionally controlling the linear movement of the second portion thereof.

10. Equipment according to claim 9, wherein the anti-skating device is adjustable thus selectively to apply a forwards or rearwards acting force of selective magnitude to the second portion of the tone arm.

11. Equipment according to claim 9, wherein the anti-skating device is hydraulically operated.

12. Equipment according to claim 2, wherein the tone arm is resiliently mounted on the deck.

* * * * *